(12) United States Patent
Mittal et al.

(10) Patent No.: US 11,309,749 B2
(45) Date of Patent: Apr. 19, 2022

(54) STATOR ASSEMBLY WITH TEETH HAVING DIFFERENT CROSS-SECTIONAL PROFILES WITH STEM AND HEAD PORTIONS

(71) Applicant: ETEL S.A., Motiers (CH)

(72) Inventors: Manish Mittal, Neuchatel (CH); Johann Pourchet, La Chaux de Gilley (FR)

(73) Assignee: ETEL S.A., Motiers (CH)

( * ) Notice: Subject to any disclaimer, the term of this patent is extended or adjusted under 35 U.S.C. 154(b) by 377 days.

(21) Appl. No.: 16/542,337

(22) Filed: Aug. 16, 2019

(65) Prior Publication Data

US 2020/0076252 A1     Mar. 5, 2020

(30) Foreign Application Priority Data

Aug. 30, 2018 (EP) .................................. 18191639

(51) Int. Cl.
  *H02K 1/14*     (2006.01)
  *H02K 1/276*    (2022.01)
  *H02K 21/16*    (2006.01)
  H02K 29/03     (2006.01)

(52) U.S. Cl.
  CPC ............ *H02K 1/146* (2013.01); *H02K 1/276* (2013.01); *H02K 21/16* (2013.01); *H02K 29/03* (2013.01)

(58) Field of Classification Search
  CPC .. H02K 1/06; H02K 1/08; H02K 1/14; H02K 1/141; H02K 1/146; H02K 1/148; H02K 1/16; H02K 1/165; H02K 1/276; H02K 3/28; H02K 3/18; H02K 3/48; H02K 21/16; H02K 29/03; H02K 2213/03

USPC .... 310/216.001, 216.069, 216.071, 216.072, 310/216.073, 216.074, 216.096, 216.097, 310/216.019, 216.059, 195, 185
  See application file for complete search history.

(56) References Cited

U.S. PATENT DOCUMENTS

| 1,381,505 A | * | 6/1921 | Sandell | .................. | H02K 19/04 |
| | | | | | 310/216.072 |
| 5,844,346 A | * | 12/1998 | Kolomeitsev | .......... | H02K 29/03 |
| | | | | | 310/254.1 |
| 5,866,966 A | | 2/1999 | Fulton | | |
| 8,217,547 B2 | * | 7/2012 | Kamiya | ................. | H02K 29/03 |
| | | | | | 310/156.56 |

(Continued)

FOREIGN PATENT DOCUMENTS

| DE | 10352814 A1 | 6/2005 |
| DE | 102005022548 A1 | 11/2006 |

*Primary Examiner* — Maged M Almawri
(74) *Attorney, Agent, or Firm* — Leydig, Voit & Mayer, LTD.

(57) ABSTRACT

A stator assembly includes a stator having a plurality of teeth which are distributed around a circumference of the stator and point toward a central axis of the stator. The teeth alternately have a first cross-sectional profile and a second cross-sectional profile, and a plurality of slots being formed between the teeth. A plurality of coils are disposed around the teeth having the first cross-sectional profile. The second cross-sectional profile has a parallel-sided stem portion and an adjoining tapered head portion. A height of the stem portion of the second cross-sectional profile is less than a height of a respective one of the coils that is disposed around an adjacent one of the teeth having the first cross-sectional profile.

10 Claims, 5 Drawing Sheets

(56) References Cited

U.S. PATENT DOCUMENTS

| | | | |
|---|---|---|---|
| 8,766,506 B2* | 7/2014 | Sano | H02K 1/146 |
| | | | 310/216.073 |
| 10,862,355 B2* | 12/2020 | Kusase | H02K 1/12 |
| 2001/0011854 A1* | 8/2001 | Heyden | H02K 3/522 |
| | | | 310/254.1 |
| 2003/0011269 A1* | 1/2003 | Takano | H02K 3/522 |
| | | | 310/216.004 |
| 2005/0099086 A1* | 5/2005 | Schunk | H02K 1/146 |
| | | | 310/216.069 |
| 2008/0197741 A1 | 8/2008 | Schunk et al. | |
| 2009/0108702 A1 | 4/2009 | Mock | |
| 2009/0243423 A1* | 10/2009 | Hattori | H02K 1/165 |
| | | | 310/216.092 |
| 2010/0117465 A1* | 5/2010 | Kamiya | H02K 29/03 |
| | | | 310/51 |
| 2012/0112594 A1* | 5/2012 | Sano | H02K 21/16 |
| | | | 310/159 |
| 2018/0102678 A1* | 4/2018 | Kusase | H02K 1/14 |
| 2021/0211003 A1* | 7/2021 | Shimokawa | H02K 1/2746 |

* cited by examiner

STATOR ASSEMBLY WITH TEETH HAVING DIFFERENT CROSS-SECTIONAL PROFILES WITH STEM AND HEAD PORTIONS

CROSS-REFERENCE TO PRIOR APPLICATIONS

Priority is claimed to European Patent Application No. EP 18191639.6, filed on Aug. 30, 2018, the entire disclosure of which is hereby incorporated by reference herein.

FIELD

The present invention relates to a stator assembly, in particular for a rotary synchronous motor. It further relates to a rotary synchronous motor including such a stator assembly.

BACKGROUND

Many electric motors, including rotary synchronous motors, include a stator assembly having a plurality of coils. The coils are typically distributed around a circumference of the stator assembly such that they surround a rotor area of the electric motor. Often, the stator is provided on its inner side with teeth arranged adjacent to one another and pointing toward a central axis of the rotor area. At least some of these teeth have a respective one of the coils disposed therearound such that the winding of the coil is accommodated in the slot; i.e., the space, between respective adjacent teeth.

It is advantageous for the power of a motor to provide a large coil volume adjacent to the rotor area. At the same time, an excessive reduction of the volume occupied by the teeth of the stator, for example due to very thin teeth, quickly results in magnetic saturation of the material surrounding the coils, which, in turn, has a detrimental effect on the power and efficiency of the motor. Therefore, conventional stator assemblies are based on a compromise between the size of the space between adjacent teeth and the tooth width.

Moreover, various techniques are known for advantageously utilizing the circumference, and thus the volume, which become larger as the radial distance from the central axis of the rotor area increases, within the stator assembly by configuring the teeth and/or coils accordingly.

US 2009/0108702 A1 describes a stator assembly where a width of both the tooth profile and the slot between adjacent teeth increases with increasing distance from the central axis of the rotor. In addition, DE 103 52 814 A1 and U.S. Pat. No. 5,866,966 describe stator assemblies were coils are disposed around respective teeth having a rectangular profile. A tooth that has a triangular profile and does not carry a coil is disposed between adjacent ones of the coils and fills the space therebetween, which becomes larger radially outwardly.

SUMMARY

In an embodiment, the present invention provides a stator assembly including a stator having a plurality of teeth which are distributed around a circumference of the stator and point toward a central axis of the stator. The teeth alternately have a first cross-sectional profile and a second cross-sectional profile, and a plurality of slots being formed between the teeth. A plurality of coils are disposed around the teeth having the first cross-sectional profile. The second cross-sectional profile has a parallel-sided stem portion and an adjoining tapered head portion. A height of the stem portion of the second cross-sectional profile is less than a height of a respective one of the coils that is disposed around an adjacent one of the teeth having the first cross-sectional profile.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
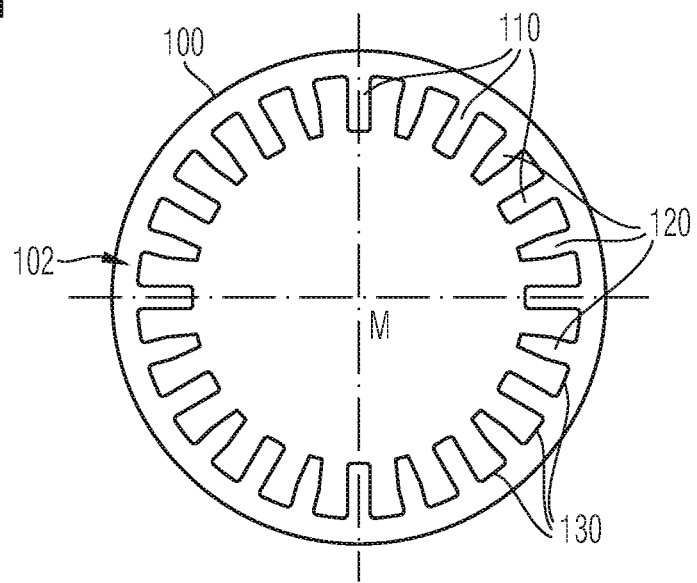
FIG. 1 is a cross-sectional schematic view of a stator for use in a stator assembly according to an exemplary embodiment.

In an embodiment, the present invention provides improvements over the aforedescribed stator assemblies using a technique that promotes improved performance of a rotary synchronous motor.

According to embodiments of the present invention, there is provided a stator assembly, in particular for a rotary synchronous motor, and a rotary synchronous motor including such a stator assembly.

In accordance with an embodiment of the present invention, the stator assembly includes a stator having a plurality of teeth which are distributed around a circumference of the stator and point toward a central axis of the stator and which alternately have a first and a second cross-sectional profile, as well as a plurality of slots formed between the teeth. The stator assembly further includes a plurality of coils which are disposed around the teeth having the first cross-sectional profile. The second cross-sectional profile has a parallel-sided stem portion and an adjoining tapered head portion. In addition, a height of the stem portion of the second cross-sectional profile is less than a height of the coil that is disposed around an adjacent tooth having the first cross-sectional profile.

The first cross-sectional profile may have a parallel-sided portion along the height of the coil. Moreover, the first and/or second cross-sectional profiles may be symmetrical about a longitudinal axis of the respective cross-sectional profile.

The height of the stem portion of the second cross-sectional profile may be in the range of from 50% to 95% of an overall height of the second cross-sectional profile.

The head portion of the second cross-sectional profile may be tapered in such a way that a smallest width of the head portion may be in the range of from 50% to 95% of a width of the stem portion of the second cross-sectional profile. The teeth may be arranged and the head portion of the second cross-sectional profile be tapered in such a way that an outer surface of the head portion of the second cross-sectional profile is oriented parallel to an outer surface of the parallel-sided portion of the tooth having the first cross-sectional profile that is adjacent to the same slot. In particular, the tooth having the first cross-sectional profile may be adjacent to the same slot as the outer surface of the head portion of the second cross-sectional profile.

Each of the coils may be disposed around a respective one of the teeth having the first cross-sectional profile. Furthermore, each of the coils may have a circumferential surface that is parallel to an outer surface of the parallel-sided portion of the first cross-sectional profile around which the respective coil is disposed. Additionally or alternatively, each of the coils may have a thickness in the range of from 85% to 100% of a smallest distance between adjacent ones of the teeth. Furthermore, the coils may each have the same height.

The first and second cross-sectional profiles may have the same overall height. Additionally or alternatively, an overall height of the first and second cross-sectional profiles may be greater than the height of the coil.

The first cross-sectional profile may have a tapered head portion in a region extending beyond the coil. The tapered head portion of the first cross-sectional profile may have a height in the range of from 0.4 mm to 0.7 mm. Further, the head portion of the first cross-sectional profile may be tapered in such a way that a width of the head portion at its top is between 0.8 mm and 1.4 mm smaller than a width of the parallel-sided portion of the first cross-sectional profile.

The stator may include a stack of stator laminations. Each of the stator laminations may have teeth which are distributed around a circumference of the stator lamination and point toward a central axis of the stator lamination and which alternately have the first and the second cross-sectional profile, as well as a plurality of slots formed between the teeth.

In accordance with a further aspect, a rotary synchronous motor is presented. The rotary synchronous motor includes a stator assembly of the type described herein and at least one rotor disposed in the stator assembly and adapted to rotate about the central axis of the stator assembly during operation of the rotary synchronous motor.

FIG. 1 shows, in schematic cross-sectional view, a stator 100 for use in a stator assembly according to an exemplary embodiment. The cross-sectional view shown corresponds, for example, to a plan view of a stator lamination. Several stator laminations of the same type may be stacked together to form stator 100. Stator 100 has a circumference 102 along which teeth 110, 120 are arranged on an inner side of stator 100. Teeth 110, 120 point to a central axis M of stator 100. Moreover, teeth 110, 120 are spaced apart from one another, thereby defining a slot 130 between adjacent ones of the teeth 110, 120.

Pairwise adjacent teeth 110, 120 of stator 100 have different cross-sectional profiles. A first group of teeth 110 has a first cross-sectional profile. A tooth 120 having a second cross-sectional profile is disposed between each pair of adjacent teeth 110 having the first cross-sectional profile. As shown schematically in FIG. 1, teeth 110 have a parallel-sided portion that extends over a substantial part of the height of tooth 110. In contrast, the teeth 120 having the second cross-sectional profile have a tapered head portion adjoining the substantially parallel-sided stem portion and extending over a substantial part of the tooth 120.

Figure 2:
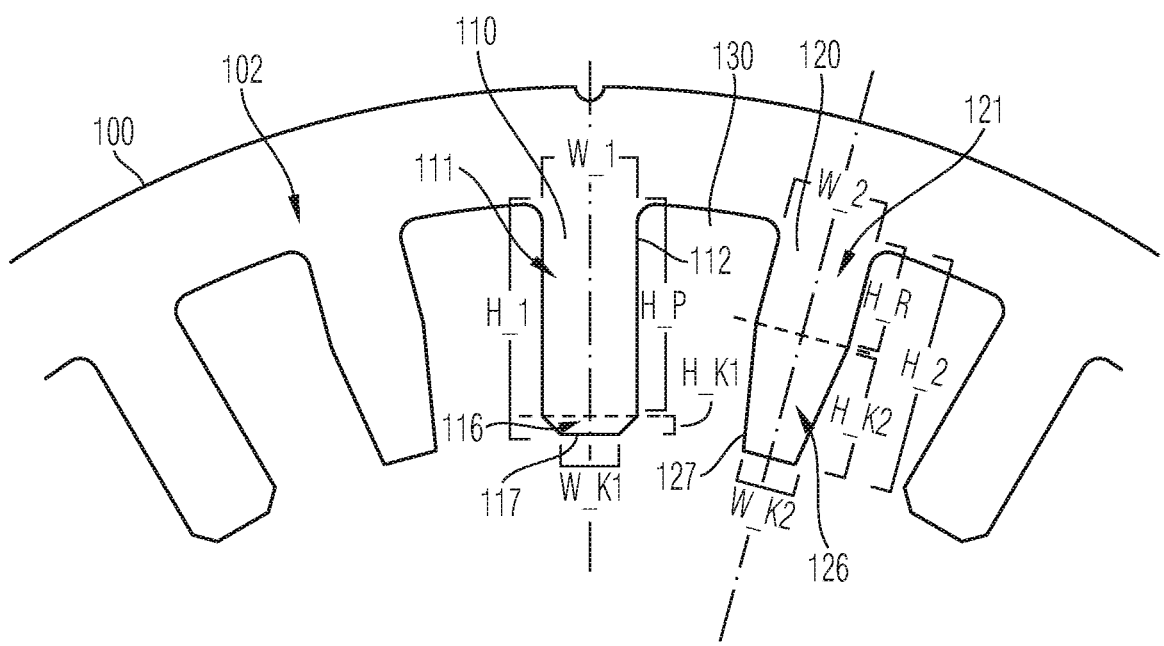
FIG. 2 is an enlarged portion of the cross-sectional view of a stator of FIG. 1.

FIG. 2 shows an enlarged portion of the stator 110 of FIG. 1. Therefore, like structural features are identified by reference numerals corresponding to those in FIG. 1. The teeth 110 having the first cross-sectional profile each have an overall height $H\_1$ and the teeth 120 having the second cross-sectional profile each have an overall height $H\_2$. In the example shown, the overall total heights $H\_1$, $H\_2$ of all teeth 110, 120 are the same. Further, in the example shown, the teeth 110 having the first cross-sectional profile also have a tapered head portion 116 adjoining the parallel-sided portion 111. However, the parallel-sided portion 111 of the tooth 110 having the first cross-sectional profile has a greater height $H\_P$ than the height $H\_R$ of the stem portion 121 of tooth 120. Accordingly, the tapered head portion 126 of the tooth 120 having the second cross-sectional profile has a greater height $H\_K2$ than the height $H\_K1$ of the tapered head portion 116 of tooth 110.

Due to the taper of head portion 126 of tooth 120, a width of the second cross-sectional profile is reduced toward the top of the tooth as compared to stem portion 121. In particular, in portion 121, tooth 120 has a width $W\_2$ which tapers along the length of head portion 126 to a reduced width, such as $W\_K2$. Similarly, due to the taper of head portion 116 of tooth 110, the first cross-sectional profile tapers from a width $W\_1$ in parallel-sided portion 111 to a reduced width $W\_K1$ at a top 117 of head portion 116.

In the example shown, height $H\_R$ of stem portion 121 of tooth 120 is approximately half the overall height $H\_2$ of tooth 120. In other examples, however, height $H\_R$ is greater in relation to overall height $H\_2$. For example, in various examples of stator 100, height $H\_R$ of the stem portion 121 is between 50% and 95% of the overall height $H\_2$, for example between 55% and 80% of the overall height $H\_2$ of tooth 120. In addition, in some examples, the taper of head portion 126 of tooth 120 is dimensioned such that tooth 120 has a minimum width $W\_K2$ at a top of head portion 126, which minimum width $W\_K2$ is in the range of from 50% to 95% of width $W\_2$ of stem portion 121.

Furthermore, in the example shown, teeth 110, 120 are so arranged, and the taper of head portions 126 of teeth 120 so selected, that an outer surface 127 of head portion 126 is oriented parallel to outer surface 112 of the tooth 11 having the first cross-sectional profile, which is adjacent to the same slot 130 as outer surface 127. As explained hereinbelow, such parallel orientation promotes the insertion of a maximum possible coil volume while providing a maximum possible tooth volume between adjacent coils at the level of head portion 126. However, in other examples of stator 100, outer surfaces 112, 127 are not oriented parallel to one another.

Figure 3:
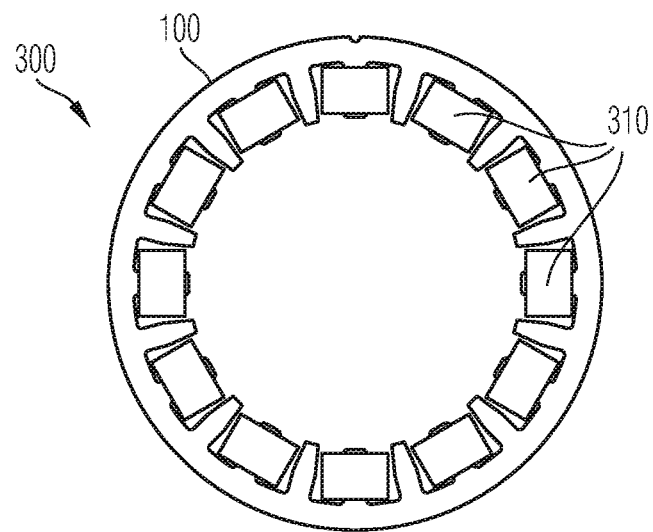
FIG. 3 is a schematic view of a stator assembly in accordance with an exemplary embodiment.

FIG. 3 schematically shows a stator assembly 300 in accordance with an exemplary embodiment. Stator assembly 300 includes a stator 100 as described hereinbefore. Stator assembly 300 further includes a plurality of coils 310, each of which is placed on a respective one of the teeth having the first cross-sectional profile. All coils in stator assembly 300 have the same height. Moreover, each tooth has an overall height greater than the height of coils 310.

Each of the coils 310 has a circumferential or lateral surface oriented at least substantially parallel to the longitudinal axis of the tooth around which the coil is disposed. Furthermore, the height of the stem portion of each of the teeth between adjacent coils is less than a height of coils. As can be seen in the drawing, the parallel-sided configuration of the stem portions of the teeth between adjacent coils produces a gap on both sides of each stem portion.

Figure 4:
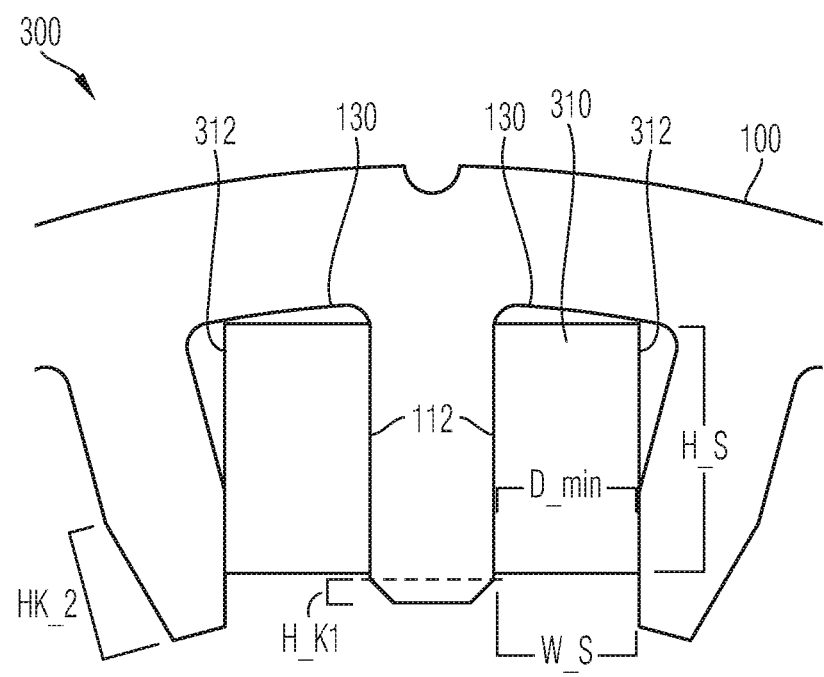
FIG. 4 is a cross-sectional view of an enlarged portion of the stator assembly of FIG. 3.

FIG. 4 shows a cross-sectional view of a portion of stator assembly 300 of FIG. 3. Therefore, like structural features are identified by like reference numerals. The portion shown illustrates a coil 310 which is disposed around a tooth having the first cross-sectional profile and is adjacent on both sides to a tooth having the second cross-sectional profile. The parallel-sided portion of the tooth having the first cross-sectional profile extends over an overall height H_S of coil 310. The tapered head portion of the tooth is located in a region that extends beyond coil 310.

A gap can be seen on both sides of coil 310 at the level of the stem portions of the adjacent teeth. The drawing also illustrates the beneficial effect of the parallel outer surfaces of adjacent teeth for the insertion of a coil of largest possible volume into the slots 130 on both sides of the tooth. A thickness W_S of coil 310 is selected to be, for example, between 85% and 100% of a smallest distance D_min between adjacent ones of the teeth.

Figure 5:
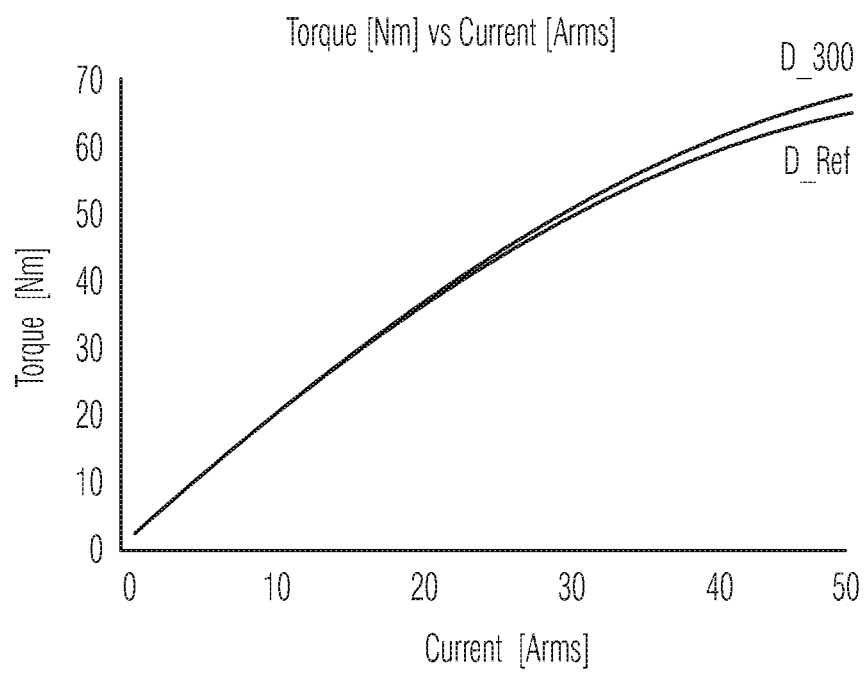
FIG. 5 is a diagram showing the motor torque as a function of current for different stator assemblies.

FIG. 5 shows a diagram of model values of the achieved motor torque as a function of current for a rotary synchronous motor having a stator assembly as described hereinbefore, graph D_300, in comparison to a reference model of a motor where no air gaps are present between adjacent coils and the teeth disposed therebetween, i.e., where the space between adjacent coils is completely filled by a triangular or trapezoidal tooth, graph D_ref.

The figure shows that the stator assembly presented herein permits a larger motor torque in particular for large currents. Such a behavior; i.e., a significantly larger motor torque obtained in particular at high currents when providing gaps between adjacent coils and the teeth located therebetween in the stem region thereof, could also be reproduced in simulations for various embodiments of rotary synchronous motors. This behavior is presumably due to a reduced effect of magnetic leakage flux, which does not contribute to the motor flux.

Figure 6A:
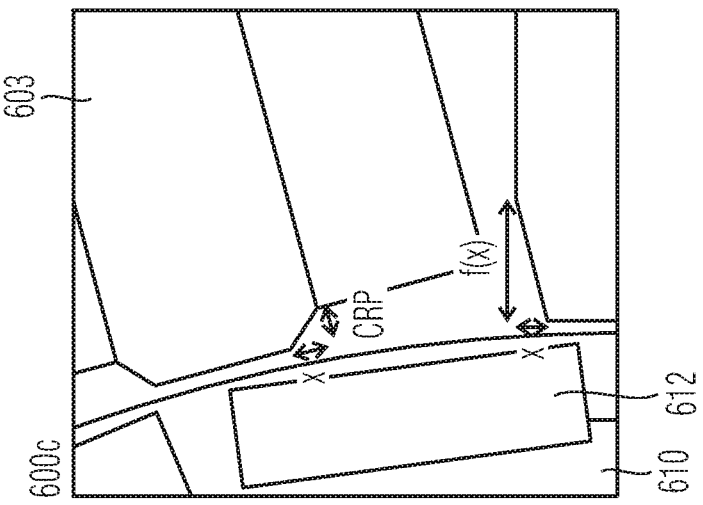
FIGS. 6a-6c are cross-sectional schematic views of rotary synchronous motors according to different exemplary embodiments.
Figure 6B:
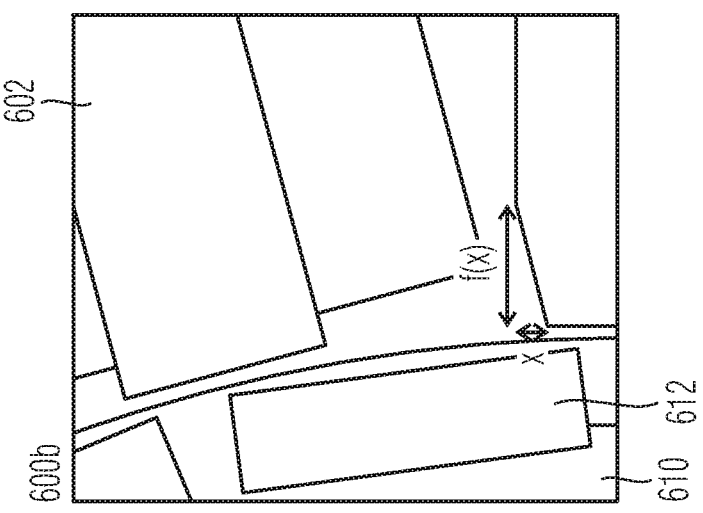
Figure 6C:
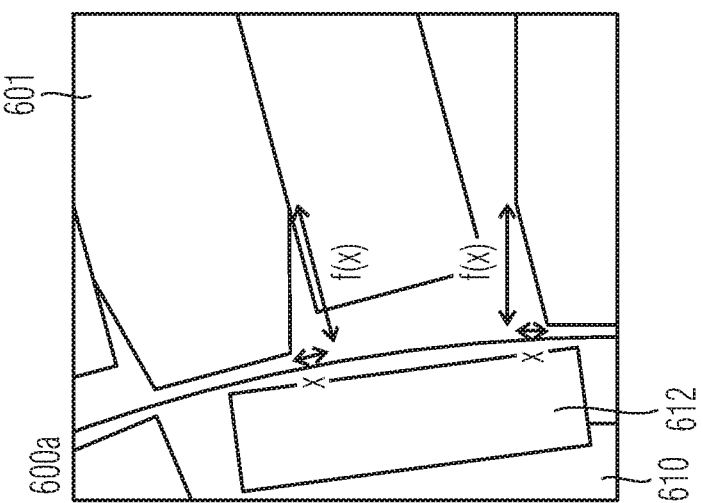

FIGS. 6A through 6C schematically show portions of rotary synchronous motors 600a, 600b, 600c according to different exemplary embodiments. Each of the motors 600a, 600b, 600c includes a stator assembly 601, 602, 603 of the type presented herein, as well as a rotor 610 disposed therein and equipped with permanent magnets 612. Motors 600a, 600b, 600c differ in the taper selected for the respective teeth having the first cross-sectional profile.

FIG. 6a shows a rotary synchronous motor 600a where the teeth having the first cross-sectional profile have the same taper in their head portions as the adjacent teeth having the second cross-sectional profile. In contrast, in the example of FIG. 6b, the teeth having the first cross-sectional profile have no taper at all. Finally, in the example of FIG. 6c, the teeth having the first cross-sectional profile have a tapered head portion whose height CRP is less than the height of the taper on the adjacent teeth with the second cross-section profile. Rotary synchronous motor 600c includes, for example, a stator assembly 603 corresponding substantially to the aforedescribed example of stator assembly 300.

Figure 7:
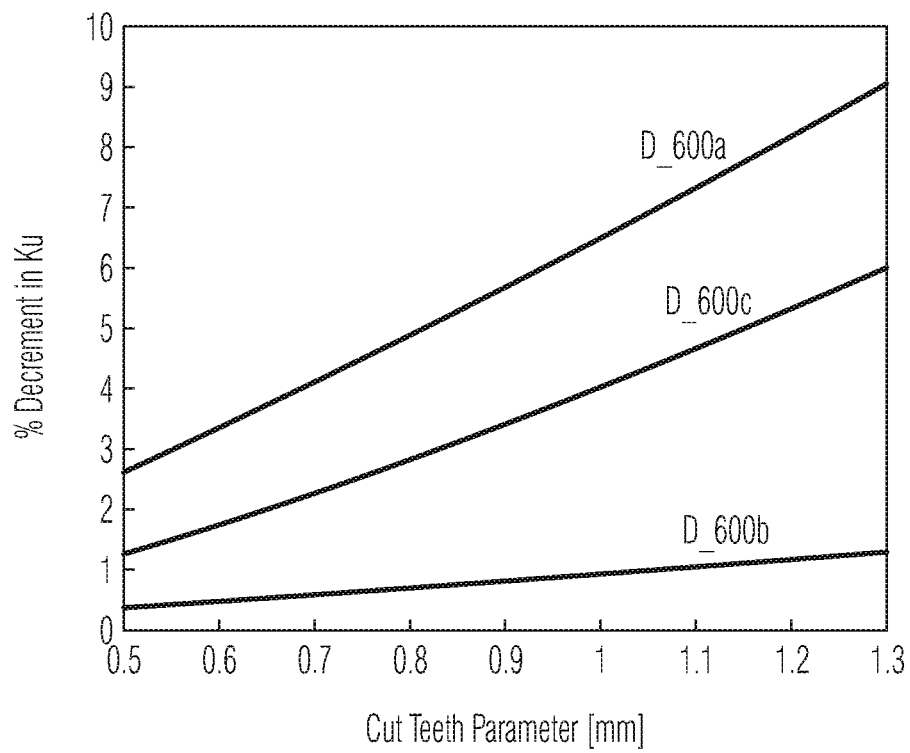
FIG. 7 is a diagram showing, for the different exemplary embodiments of FIGS. 6a-6c, the decrease in continuous torque as a function of the cut teeth (taper) parameter of the teeth having the second cross-sectional profile.

FIG. 7 shows a diagram illustrating the decrease in continuous torque Ku as a function of the taper depth of the teeth having the second cross-sectional profile for each of the examples of FIGS. 6a through 6c. In the example of FIG. 6a, all teeth have the same taper, and therefore, the teeth having the first cross-sectional profile also have a correspondingly varying taper.

As is apparent from FIG. 7, motor 600a of FIG. 6a experiences the greatest decrease in continuous torque with increasing taper depth. This is explainable by the fact that the reduction of tooth material is greatest in this example. In accordance with this, motor 600b of FIG. 6b in turn exhibits the smallest decrease in continuous torque. Finally, in the case of motor 600c of FIG. 6c, the dependence of the continuous torque on the taper depth is between those of the aforementioned examples.

A small decrease in the continuous torque, as in the example of FIG. 6b, is often advantageous. However, since the teeth of this example are shaped very differently, motor 600b exhibits high adverse cogging torques. In this regard, tapering the head portions of the teeth having the first cross-sectional profile is suitable to significantly reduce cogging torques, as will be described below with reference to FIG. 8.

Figure 8:
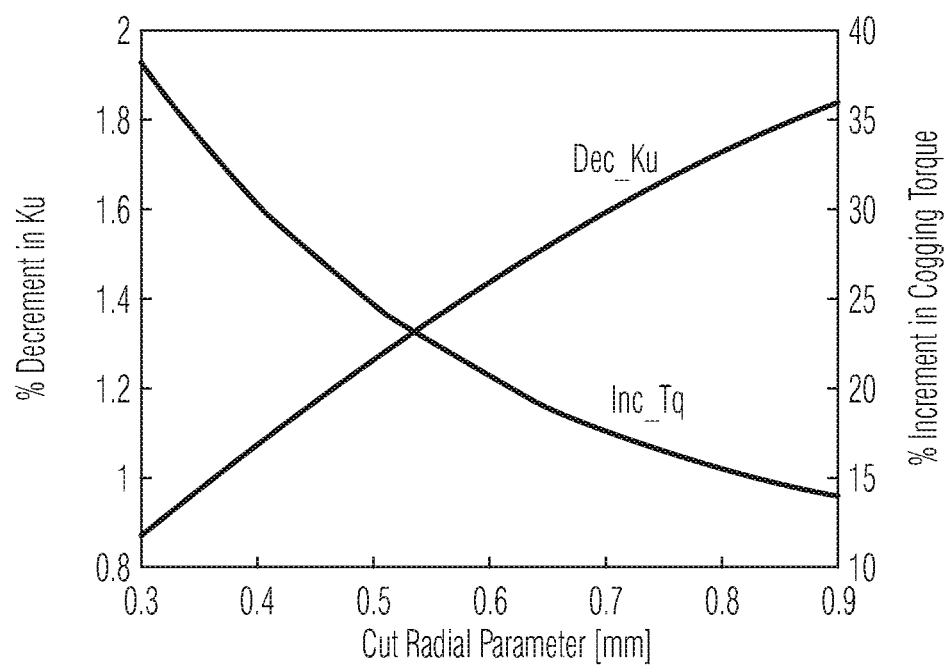
FIG. 8 is a diagram showing, for the exemplary embodiment of FIG. 6c, the decrease in continuous torque and the increase in cogging torque, each as a function of the cut radial (taper) parameter of the teeth having the first cross-sectional profile.

FIG. 8 shows, for the example of FIG. 6c, the decrease in continuous torque and the increase in cogging torque, each as a function of the cut radial parameter (CRP) of the head portions of the teeth having the first cross-sectional profile. As explained in connection with the extreme cases of FIGS. 6a and 6b, a greater taper of the teeth having the first cross-sectional profile leads on the one hand to reduced cogging torques but on the other hand also to a reduced continuous torque. Knowing this dependence, as shown in FIG. 8 on the basis of a simulation, it is possible to optimize the first cross-sectional profile in targeted manner with respect to continuous torque and cogging torque.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A stator assembly comprising:
a stator having a plurality of teeth which are distributed around a circumference of the stator and point toward a central axis of the stator, the teeth alternately having a first cross-sectional profile and a second cross-sectional profile, a plurality of slots being formed between the teeth; and
a plurality of coils which are disposed around the teeth having the first cross-sectional profile;
wherein the second cross-sectional profile has a parallel-sided stem portion and an adjoining tapered head portion, and wherein a height of the stem portion of the second cross-sectional profile is less than a height of a respective one of the coils that is disposed around an adjacent one of the teeth having the first cross-sectional profile,
wherein the head portion of the second cross-sectional profile is tapered in such a way that a smallest width of the head portion is in a range from 80% to 95% of a width of the stem portion of the second cross-sectional profile, and
wherein the first cross-sectional profile has a parallel-sided portion along the height of the respective one of the coils, and wherein the teeth are arranged and the head portion of the second cross-sectional profile is tapered in such a way that an outer surface of the head portion of the second cross-sectional profile is oriented parallel to an outer surface of the parallel-sided portion of the respective one of the teeth having the first cross-sectional profile that is adjacent to a same respective one of the slots.

2. The stator assembly as recited in claim 1, wherein the height of the stem portion of the second cross-sectional profile is in a range of from 50% to 95% of an overall height of the second cross-sectional profile.

3. The stator assembly as recited in claim 1, wherein each of the coils has a circumferential surface that is parallel to an outer surface of the parallel-sided portion of the first cross-sectional profile around which the coil is disposed.

4. The stator assembly as recited in claim 1, wherein the first cross-sectional profile and the second cross-sectional profile have the same overall height.

5. The stator assembly as recited in claim 1, wherein a thickness of the coil is in a range of from 85% to 100% of a smallest distance between adjacent ones of the teeth.

6. The stator assembly as recited in claim 1, wherein the coils each have the same height, and each of the coils is disposed around a respective one of the teeth having the first cross-sectional profile.

7. The stator assembly as recited in claim 1, wherein the stator includes a stack of stator laminations, each having teeth which are distributed around a circumference of the stator lamination and point toward a central axis of the stator lamination and which alternately have the first and the second cross-sectional profile, a plurality of slots being formed between the teeth of the stator laminations.

8. The stator assembly as recited in claim 1, wherein an overall height of the first cross-sectional profile and an overall height of the second cross-sectional profiles are greater than the height of the respective one of the coils.

9. The stator assembly as recited in claim 8, wherein the first cross-sectional profile has a tapered head portion in a region extending beyond the respective one of the coils.

10. A rotary synchronous motor comprising:
a stator assembly comprising:
a stator having a plurality of teeth which are distributed around a circumference of the stator and point toward a central axis of the stator, the teeth alternately having a first cross-sectional profile and a second cross-sectional profile, a plurality of slots being formed between the teeth; and
a plurality of coils which are disposed around the teeth having the first cross-sectional profile;
wherein the second cross-sectional profile has a parallel-sided stem portion and an adjoining tapered head portion, and wherein a height of the stem portion of the second cross-sectional profile is less than a height of a respective one of the coils that is disposed around an adjacent one of the teeth having the first cross-sectional profile,
wherein the head portion of the second cross-sectional profile is tapered in such a way that a smallest width of the head portion is in a range from 80% to 95% of a width of the stem portion of the second cross-sectional profile, and
wherein the first cross-sectional profile has a parallel-sided portion along the height of the respective one of the coils, and wherein the teeth are arranged and the head portion of the second cross-sectional profile is tapered in such a way that an outer surface of the head portion of the second cross-sectional profile is oriented parallel to an outer surface of the parallel-sided portion of the respective one of the teeth having the first cross-sectional profile that is adjacent to a same respective one of the slots; and
at least one rotor disposed in the stator assembly and adapted to rotate about the central axis of the stator assembly during operation of the rotary synchronous motor.

\* \* \* \* \*